United States Patent [19]
Jaun et al.

[11] Patent Number: 5,107,156
[45] Date of Patent: Apr. 21, 1992

[54] SYNCHRONOUS MOTOR

[76] Inventors: Hermann Jaun, Pfanstrasse 13, CH 8105 Regensdorf; Walter Wyss, Humrigenstrasse 51, CH-8704 Regensdorf, both of Switzerland

[21] Appl. No.: 611,681

[22] Filed: Nov. 13, 1990

[51] Int. Cl.⁵ .................................... H02K 21/00
[52] U.S. Cl. ...................... 310/162; 310/77; 310/92; 310/156; 310/266; 188/171
[58] Field of Search ............... 310/162–165, 310/266, 40 MM, 76, 209, 156, 77, 191, 92, 93, 67 R, 181, 216, 254, 261; 188/171, 173

[56] References Cited

U.S. PATENT DOCUMENTS

| | | | |
|---|---|---|---|
| 1,227,185 | 5/1917 | Neuland | 310/266 |
| 2,653,256 | 9/1953 | Walley | 310/76 |
| 3,581,394 | 6/1971 | Phelon | 310/156 |
| 3,735,174 | 5/1073 | Bosch | 310/266 |
| 4,633,109 | 12/1986 | Feigel | 310/266 |
| 4,731,554 | 3/1988 | Hall | 310/67 R |
| 4,734,604 | 3/1988 | Sontheimer | 188/171 |
| 4,829,205 | 5/1989 | Lindgren | 310/266 |

FOREIGN PATENT DOCUMENTS

| | | | |
|---|---|---|---|
| 0971680 | 2/1959 | Fed. Rep. of Germany | 310/266 |
| 1200931 | 9/1965 | Fed. Rep. of Germany | 310/77 |

*Primary Examiner*—Skudy R.
*Attorney, Agent, or Firm*—Laurence R. Brown

[57] ABSTRACT

The synchronous motor includes at its rotor a thin-walled cylindrical cup member. This cup member includes at its outer side a plurality of rings which are electrically insulated against each other. A plurality of rod shpaed permanent magnets are in turn arranged at the surface of the rings and extend parallel to the rotor axis. Preferably a braking unit is located at the inside between the inner side of the cup and the rotor shaft which unit act as a standstill brake.

8 Claims, 1 Drawing Sheet

SYNCHRONOUS MOTOR

BACKGROUND OF THE INVENTION

1. Field of the invention

The present invention relates to a synchronous motor, specifically for servo drives and including a stator located in a casing and a rotor equipped with a plurality of permanent magnets and supported by casing covers.

2. Description of the prior art

A large number of designs of such motors is generally known and find use in many applications. Specifically if used as servomotor severe demands are made regarding a precise positioning and information of the position of the rotor and the maintaining of the position by the rotor in its stopped condition. It is desired to obtain reaction times which are as short as possible.

Commonly known motors occupy a relatively large space if a brake or an indicator (sensor) is to be included besides the rotor. These auxiliary units are usually coupled to the motor axis which leads to a large installed length.

SUMMARY OF THE INVENTION

It is, therefore, a general object of the invention to unite all functions of such a motor in a as small as possible space.

A further object of the invention is to provide a synchronous motor in which the rotor comprises a thin-walled cup member which is open at one end and includes a bottom via which it is releasably mounted to the rotor shaft; further a plurality of rings made of a magnetizable material and insulated electrically against each other, which rings are lined up at the outer wall of the cylindrical cup member and held thereupon; and comprises a plurality of bar shaped permanent magnets located at the outer side of the rings and extending parallel to the axis of the rotor.

This leads to a rotor having a low inertia and offers at its inner side sufficient space for mounting special equipment.

A further object is to provide a synchronous motor in which a sensor is mounted between the inner wall of the cylindrical cup member and the rotor shaft and intended for a recognizing and transmitting of markings on the rotor shaft or on the inner surface of the cylindrical cup member or of the position of the rotor.

Due to the advantageous design of the rotor it is possible to integrate e.g. a brake in the motor casing without having to increase the dimensions of the motor. Further, a reduction of the inertia of the rotor produces still further advantages such as a reduction of the start-up and braking time, an improved performance regarding oszillations and a decrease of its weight.

Yet a further object is to provide a synchronous motor in which the means for braking the rotor comprise a fixed portion mounted to the casing and including an axial winding and an axially displaceable portion onto which brake linings are mounted and which upon an interruption of the power supply is urged due to a spring force onto a brake lining on said cylindrical cup member but is displaceable by induction of the exciting current of the stator in the winding of the fixed portion of the braking means axially against the spring force such that the brake linings of the braking means and of the cylindrical cup member are disengaged from each other such to act as standstill brake.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
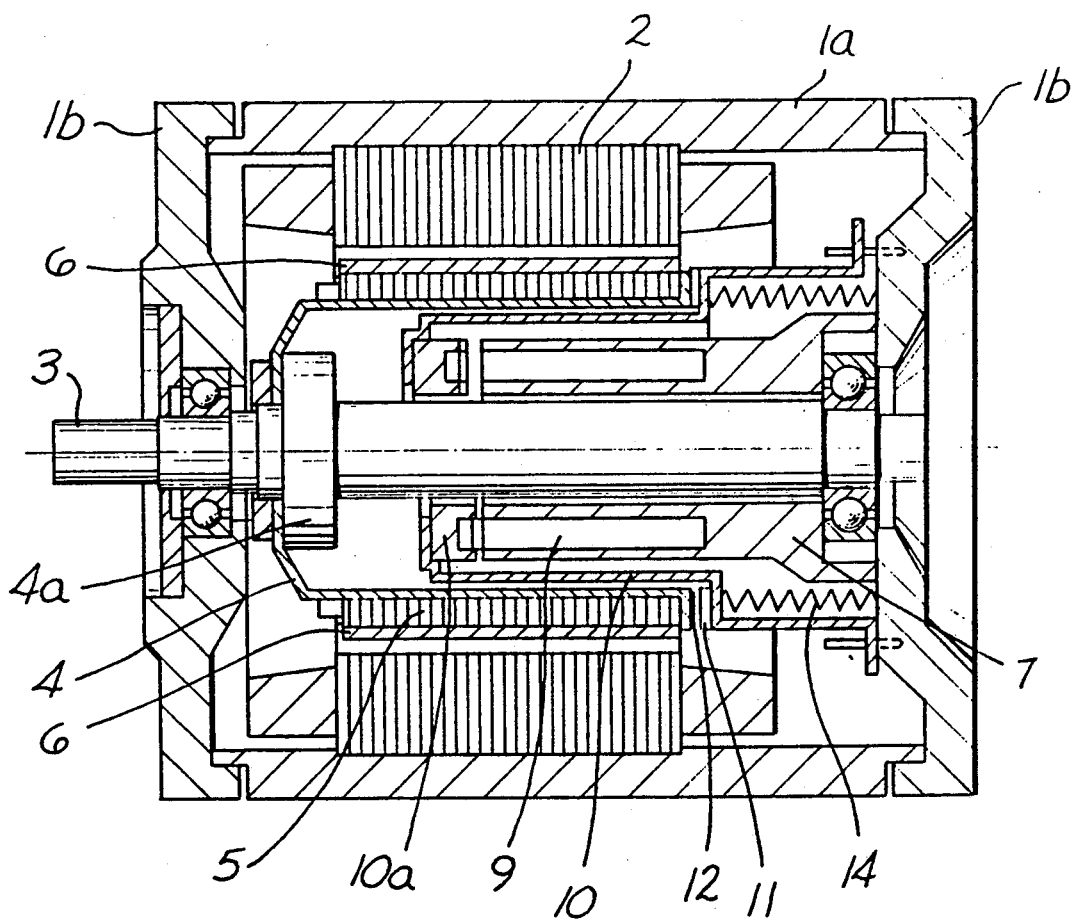
FIG. 1 illustrates a longitudinal section through a synchronous motor having a braking means and structured in accordance with the invention.

The longitudinal section through a synchronous motor structured in accordance with the invention illustrated in FIG. 1 depicts in its upper half a braking unit 7 in its braked condition and in its lower half the braking unit 7 in its released unbraked condition. The stator 2 is mounted at the inner wall of the motor casing 1a and structured in accordance with generally known designs. The rotor 4 is supported in the two casing covers 1b whereby the rotor shaft 3 projects from the one side out of the casing cover and serves as driving a shaft. A thin-walled cylindrical cup rotor 4 is mounted via its bottom 4a fixedly to the rotor shaft 3 to rotate therewith. A plurality of rings 5, consisting of dynamo sheet iron, or a sintered magnetizable material, which are insulated electrically against each other are lined up onto its outer surface and fixedly held thereupon. A plurality (not shown) of rod shaped permanent magnets 6 (only two are shown) are in turn lined up onto the surface formed by the rings 5. These permanent magnets 6 possess when viewed radially respective alternating polarities. A sychronous motor assembled in mentioned manner includes now inside of the cylindrical cup rotor 4 up to the rotor shaft 3 sufficient space for a mounting of special or auxiliary devices.

This space is specifically suitable for the mounting of a braking unit 7 such as illustrated in this figure. The braking unit consists of a fixed portion mounted to the right hand casing cover 1b, and of an axially displaceable portion 10 which includes the brake linings 11 for the braking of the rotor 4. A radial winding 9 is mounted in the fixed portion of the braking unit 7. If current is applied at the stator winding to run the motor a voltage is induced in the winding 9 and a magnetic field is generated which shifts the head 10a of the displacable portion 10 of the braking unit axially such that the brake linings 11 of the braking unit release the linings 12 of the cup member of the rotor 4 and thus release the rotor 4 such as is illustrated in the lowerhalf of FIG. 1.

If the supply of current to the motor is interrupted the induced magnetic field is cancelled and the movable portion 10 of the braking unit is moved by the spring 14 axially in the other direction such that the brake linings contact each other and the rotor is braked. Thus, a standstill braking is obtained and the rotor can be moved on the drive shaft only at a large expenditure of force. Due to the space saving design of the rotor 4 of the motor the space requirement, in spite of an additional function of the motor, has not increased in comparison with known solutions having braking units or similar devices coupled thereto.

Quite obviously it is possible to mount in a synchronous motor structured as exemplified above other devices such as an optical sensor in place of or in addition to the braking unit in accordance with a prevailing application.

Due to the inventive design of the motor it is possible to select and mount the rotor shaft or if necessary the rotor in accordance with the set demands at a minimal expenditure.

While there is shown and described a present preferred embodiment of the invention it is to be distinctly understood that the invention is not limited thereto but may be otherwise variously embodied and practiced within the scope of the following claims.

We claim:

1. A synchronous motor, specifically for servo drives comprising in combination a stator located in a casing, a rotor supported in end covers of the casing, said rotor comprising a cylindrical thin-walled cup member which is open at one end, a plurality of concentric rings made of a magnetizable material and insulated electrically from each other carried on the outer wall of the cylindrical thin-walled cup member, and a plurality of bar shaped permanent magnets located to span said rings and extend parallel to the rotor with alternating magnetic polarities radially disposed about the rotor.

2. The synchronous motor of claim 1, in which said rings consist of dynamo sheet iron.

3. The synchronous motor of claim 1, wherein said rings consist of a sintered magnetizable material.

4. A synchronous motor as defined in claim 1 further comprising means for axially displacing said rotor.

5. A motor as defined in claim 4, further comprising means for braking said rotor when the motor is not energized, having a brake lining axially displaceable with said rotor and induction means for displacing said rotor when the motor is energized.

6. A motor as defined in claim 4, wherein said means for axially displacing said rotor further comprises said claim responsive to energization of the motor to displace the rotor.

7. A synchronous motor, specifically for servo drives comprising in combination, a stator located in a casing, a rotor supported in end covers of the casing, said rotor comprising a cylindrical thin-walled cup member which is open at one end, a plurality of concentric rings made of a magnetizable material and insulated electrically against each other, carried on the outer wall of the cylindrical cup member, and a plurality of bar shaped permanent magnets located to span said rings and extend parallel to the rotor with alternating magnetic polarities radially disposed about the rotor, and means for braking the rotor located on said cylindrical thin-walled cup member, said braking means being operative to act via brake lining affixed to said casing.

8. A synchronous motor of claim 7, wherein said means for braking the rotor comprise a lining portion mounted to said rotor cup member, an axial winding operable on the rotor arm member for axially displacing the brake linings to permit rotation of the rotor, a spring forcing the brake lining portion on said cylindrical thin-walled cup member into contact with the brake lining of the casing, in absence of exciting current in the axial winding so that the brake linings are disengaged from each other, whereby said braking means act as a standstill brake when the axial winding is unenergized.

* * * * *